March 7, 1939.  F. BRIESE  2,149,907
UNIVERSAL JOINT
Filed Nov. 5, 1937  2 Sheets-Sheet 1
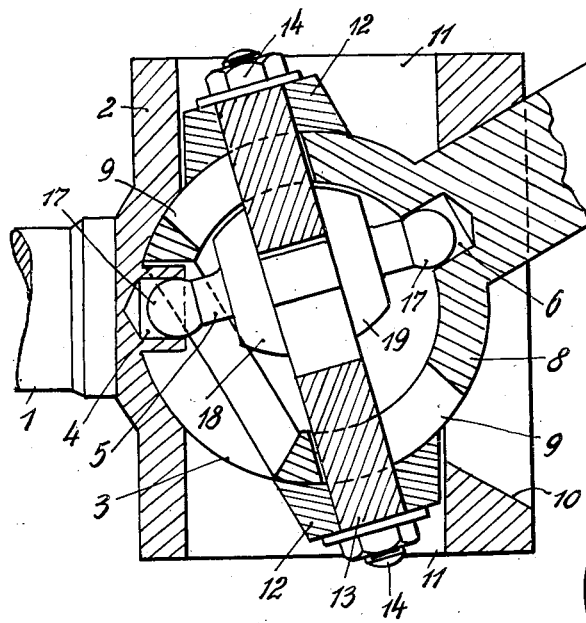
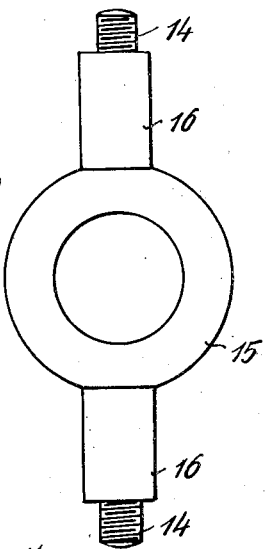
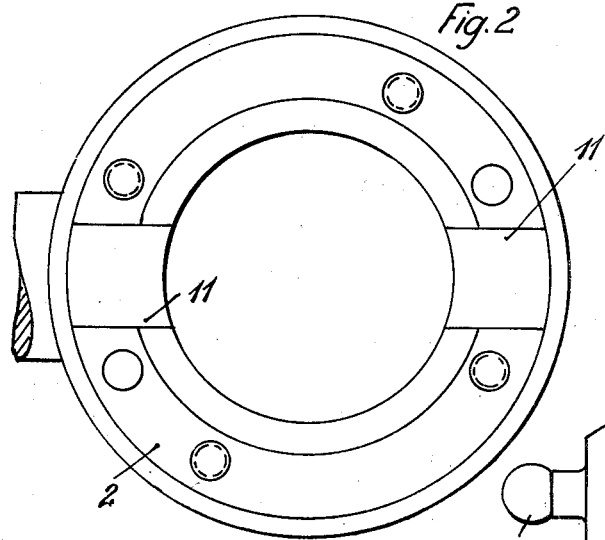
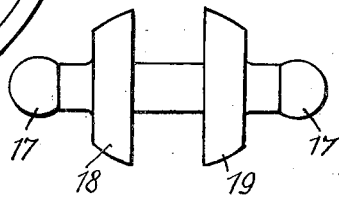
Inventor:
Fritz Briese March 7, 1939.   F. BRIESE   2,149,907
UNIVERSAL JOINT
Filed Nov. 5, 1937   2 Sheets-Sheet 2
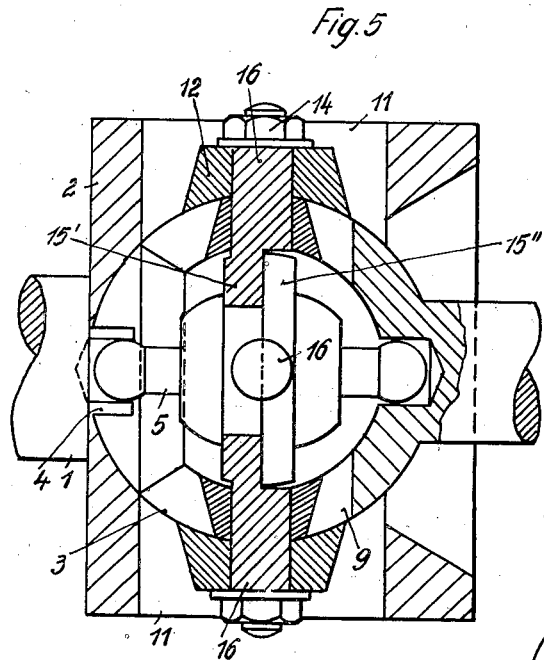
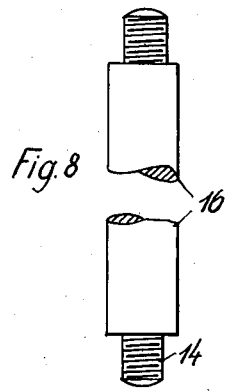
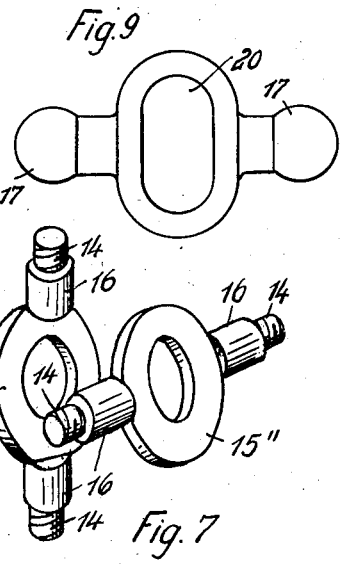
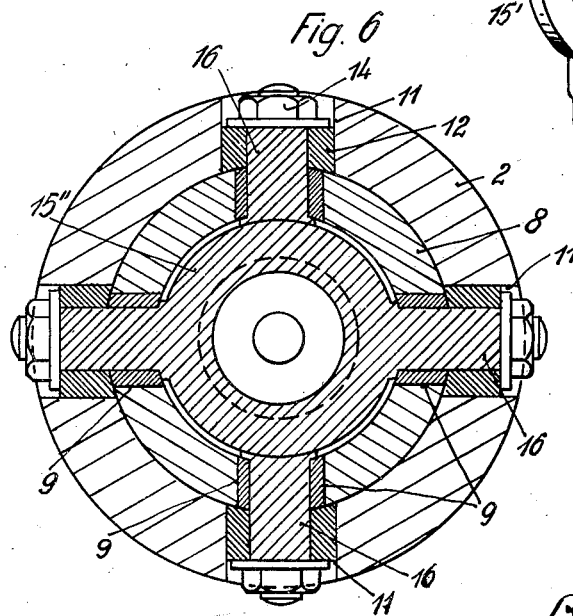
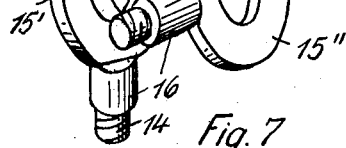
Inventor:
Fritz Briese Patented Mar. 7, 1939

2,149,907

UNITED STATES PATENT OFFICE 2,149,907

UNIVERSAL JOINT

Fritz Briese, Soest, Germany, assignor to Otto Steffen, Apparatebau, Soest, Germany Application November 5, 1937, Serial No. 172,916
In Germany November 5, 1936

8 Claims. (Cl. 64—21)

My invention concerns a ball joint which is particularly suitable for the articulated drive of power driven vehicles.

Ball joints and double Cardan joints are known for the articulated drive of power driven vehicles. In order that the transmission of the rotary moment with such joints may take place evenly, it is necessary to cause both shafts—the driving and driven shafts—to rotate at the same angular speed. This is the case if the drive transmitting member connecting the two halves of the joint is always in a plane which bisects the angle between the driving and driven shafts.

Joints are already known, it is true, which fulfill this requirement in which the end of one shaft which is formed as a ball is supported in the end of the other shaft which is formed as a ball socket and the ball is connected with the ball socket by a drive transmitting member. The known types of construction have, however, very many and very sensitive working parts, which as a whole produce such considerable friction in the joints during operation, that the efficiency of the power transmission is essentially reduced thereby. Moreover, the requirements of a large number of parts or frictional surfaces are such that the joints produced therewith are often not adequately lubricated for the transmission of large loads, but readily become warm and bind.

The object of the present invention is the production of a joint of the type referred to consisting of a small number of parts of robust construction, which satisfies the theoretical mechanical conditions explained above.

The object of this invention is attained in that the drive transmitting member passes diametrically through the joint and is controlled by a link supported in the two shaft ends. In accordance with this invention the drive transmitting member is so held by means of blocks which slide in slots of the ball socket so that it can only turn and oscillate about the middle point of the ball.

A further feature of this invention consists in that the drive transmitting member has sliding blocks, rollers, or balls where it comes in contact with the slots of the joint.

The transfer of larger rotary moments through the joint necessarily increases the number of the transmission parts of the drive transmitting member. Increase of the number of sliding faces is not, however, immediately possible since the pins of the drive transmitting member are guided backwards and forwards through the joint in the sector like slots—which may be increased in number—of the ball and socket on oscillation of the joint during rotation, and consequently their distance from one another continually varies.

A particular embodiment of the invention enables the joint to be made for the transmission of larger rotary moments. This takes place in accordance with this feature of the present invention in that the drive transmitting member passing diametrically through the joint is subdivided in a longitudinal direction while the transmitting parts of the subdivided drive transmitting member can vary their distance from one another.

This subdivision of the drive transmitting member can be attained, for example, in that the drive transmitting member having the form of a ring can be divided according to the number of the pins into two or more rings and the opposite drive transmitting pins can be so rigidly connected with their rings that with the drive transmitting member assembled all the pins lie in one plane and the axes of all the pins pass through the middle of the drive transmitting rings or the ring sections.

According to a particular feature of this invention the total width of the drive transmitting rings is equal to the width of a drive transmitting ring with only two transmitting parts (pins, blocks, or the like).

Moreover, the link passes through the drive transmitting member and controls it positively by means of guide cheeks.

In another embodiment of the invention the drive transmitting member passes through a slot-shaped aperture of the link, and is positively controlled thereby.

A further feature of the invention is that the link is mounted with its ends like a ball joint in the ends of the driving and driven shafts.

In this the bearing ends of the link according to this invention lie symmetrically to the centre point of the control system formed by link and drive transmitting member.

In the appended drawings in which an embodiment of the invention is shown,

Figure 1 is a longitudinal section through the joint,

Figure 2 a plan of the driving shaft,

Figure 3 shows the drive transmitting member in plan.

Figure 4 is the link in elevation.

Figure 5 is a longitudinal section through a modified form of the ball joint.

Figure 6 is a cross section of Figure 5.

Figure 7 is a diagrammatic illustration of a divided drive transmitting member with, for example, four pins as in Figures 5 and 6.

Figure 8 shows another form of a drive transmitting member in plan.

Figure 9 is another form of a link in elevation.

In the drawings, 1 denotes the driving shaft on whose end a shell-like carrier 2 for the actual ball socket 3 is arranged. The shell 2 for constructive reasons may be made in two parts. The ball socket 3 is inserted into the shell 2. In the shaft axis lies a ball support 4 for the link 5. A similar support 6 is provided at the end of the driven shaft 7 in the axis thereof.

The driven shaft 7 is formed with a hollow ball 8 which is provided with longitudinal slots 9 parallel to the axis of the shaft. The ball 8 is disposed in the ball socket 3. Suitable stops 10 in the shell 2 limit the angular movement of the driven shaft 7. In the embodiment shown the maximum angular deviation of the driven shaft 7 with respect to the driving shaft 1 is 30°.

In the shell 2 of the driving shaft are provided longitudinal slots 11 parallel with the shaft axis, in which slots blocks 12 are fitted, whose inner surfaces are curved corresponding to the surfaces of the ball 8 on which they can slide. The blocks 12 act to maintain the drive transmitting member 13 in a predetermined position with respect to the centre point of the ball which is effected, by means of a screw connection 14. The blocks 12 can be replaced—while maintaining the guiding effect—by rollers or balls. The drive transmitting member 13 is also guided in the slots 9 of the ball 8 or inside of the ball 8.

The form of the drive transmitting member 13 is apparent from Figure 3, while Figure 1 shows a longitudinal section.

As the drawings show, the drive transmitting member 13 consists of a ring 15 whose outer diameter is smaller than the inner diameter of the hollow ball 8. On the ring 15 are provided two diametrically opposed pins 16 which serve as supporting points in the slots 9 of the ball 8. These supporting points could also be provided with sliding blocks, roller or ball bearings. Instead of the two sliding blocks 12 or rollers arranged at one end of the drive transmitting member, only one roller may be provided which preferably has a wedge-shaped form by which the hollow ball and the ball sockets are connected. The slots 9 in the hollow ball 8 as well as the slots 11 in the shell 2 must then be given an inclination of their long walls corresponding to the wedge-angle. The ends of the pins 16 are provided with screw threads 14 with the object of fixing the drive transmitting member to the blocks 12.

The axis of the link 5 passes through the drive transmitting ring 15. The construction of the link may be seen from Figure 4. It consists of an axis pin which is extended at each end into a ball 17. The balls are, as explained, arranged in corresponding supports 4 and 6 of the driving and driven shafts. The distance of the ball or of the supports from the centre point of the joint is equally great. They lie according to the invention symmetrically to the middle point of the control system formed by the link and drive transmitting member. On the link are guide cheeks 18, 19, which abut with their inner faces on the ring part 15—which is preferably ground of the drive transmitting member 13. The circumference of the guide cheeks is formed spherical to suit the inner diameter of the hollow ball 8.

The drive transmitting member 13 can also be formed without the ring part. It is then guided by a link which has instead of the guide cheeks a slot-shaped aperture through which the drive transmitting member passes. In this case the drive transmitting member would no longer be urged to rotate about its axis and could have sliding points at the points of contact with the ball. On the other hand, the drive transmitting member can rotate about its own axis so that it rolls on the transmission faces.

By the arrangement described the advantages explained above of an even transmission of the rotatable movement are obtained. The link 5 moves, for a given angular position of the driven shaft 7 with respect to the driving shaft 1, the drive transmitting member 13 always into such a position that it comes to lie in the plane of the bisector of the angle between both shafts. In such a position, however, the rotatable movement is evenly transmitted.

A modified embodiment of the invention is shown in Figures 5 to 7.

The drive transmitting member is subdivided according to this feature of the invention. How the division of the drive transmitting member can take place is shown by way of example in the drawings which show an embodiment of a divided transmitting member in which four pins are present. It is essential that the diametrically opposed pins should be able to vary their distance with respect to adjacent pins so that the drive transmitting members can follow the sector slots of the ball and ball socket on oscillation of the joint during rotation.

The rings 15', 15" of the assembled drive transmitting member lie on one another in such a way that the pins 16 are in staggered relation to one another. Each ring part is so formed that in the assembled drive transmitting member the axes of all pins lie in one plane and pass through the middle of the drive transmitting ring or the bearing parts.

The total width of the ring parts 15', 15" is preferably so selected that it corresponds to the width of a drive transmitting ring with only two transmitting parts or pins 16.

It is obvious that the increase in number of the transmitting parts in the sense of the invention allows the transmission of a larger rotary moment without disturbances being able to take place during the running of the joint.

A modified form of the transmitting member and a corresponding modified link are shown in Figures 8 and 9. In this modification, the drive transmitting member is in the shape of a smooth rod 16 with threaded ends 14 and passes through a slot-shaped aperture 20 in the link which is provided with two ball shaped ends 17 as in Figure 4.

It will be understood that the transmitting member and link shown in Figures 8 and 9 are embodied in the ball joint shown in Figures 1 and 2 substantially in the same manner as the transmitting member and link shown in Figures 3 and 4 so that it will not be necessary to illustrate the complete joint embodying these modified parts.

Manifestly, further modifications of the invention are possible without departing from the scope of the same.

I claim:—

1. In a ball joint, in combination with a shaft having one of its ends formed as a ball-socket and a second shaft having one of its ends formed as a ball engaging the ball-socket in said first shaft, a link disposed with its ends in the said two shaft ends, and a drive transmitting member controlled by said link and passing diametrically through slots in said ball and provided with sliding members peripherally engaging said ball so as to guide said drive transmitting member with respect to said ball and ball-socket whereby said drive transmitting member can oscillate only about the center point of said ball.

2. In a ball joint, in combination with a shaft having one of its ends formed as a ball-socket and a second shaft having one of its ends formed as a ball engaging said ball-socket, a drive transmitting member passing diametrically through said ball and a link extending through said drive transmitting member and provided with cheeks in engagement with said drive transmitting member so as to positively control the position of the same.

3. In a ball joint, in combination with a shaft having one of its ends formed as a ball-socket and a second shaft having one of its ends formed as a ball in engagement with said ball-socket, a link having ball-shaped ends adapted to engage corresponding cavities in said two shaft ends in the manner of a universal joint, and a drive transmitting member controlled by said link and extending diametrically through said ball.

4. In a ball joint, in combination with a shaft having one of its ends formed as a ball-socket and a second shaft having one of its ends formed as a ball in engagement with said ball-socket, a control system, comprising a drive transmitting member extending diametrically through said ball and a link adapted to control said drive transmitting member and having ball-shaped ends engaging corresponding sockets in said two shaft ends, the said link ends being thereby held symmetrically relative to the center point of said control system.

5. In a ball joint, in combination with a shaft having one of its ends formed as a ball-socket and a second shaft having one of its ends formed as a ball in engagement with said ball-socket, a link loosely disposed in said two shaft ends, and a drive transmitting member controlled by said link and extending diametrically through said ball being subdivided in its longitudinal direction, the transmitting portions of said drive transmitting member being adapted to vary their distances from each other.

6. In a ball joint in combination with a shaft having one of its ends formed as a ball-socket and a second shaft having one of its ends formed as ball in engagement with said ball-socket, a link having its ends loosely disposed in the said two shaft ends, and a plurality of drive transmitting members each comprising a central portion and two opposed drive transmitting pins, said central portions being superposed upon each other and so shaped that the axes of all the said pins lie in one plane and extend through the common middle axis of the said drive transmitting members, the said link being adapted to control said drive transmitting members.

7. In a ball joint, in combination with a shaft having one of its ends formed as a ball-socket and a second shaft having one of its ends formed as a ball in engagement with said ball-socket, a link disposed with its ends in cavities in said two shaft ends, and a plurality of drive transmitting members each comprising a central portion and two opposed drive transmitting pins, said central portions being superposed on each other and so shaped that the axes of all of said drive transmitting pins lie in one plane extending through the common middle axis of said drive transmitting members, said link passing through co-axial bores in the central portions of said drive transmitting members and adapted to control said members.

8. In a ball joint, in combination with a shaft having one of its ends formed as a ball-socket and a second shaft having one of its ends formed as a ball in engagement with said ball-socket, a link disposed with its ends in cavities of said two shaft ends, and a plurality of drive transmitting members each comprising a central portion and two opposed drive transmitting pins, said central portions being superposed upon each other and so shaped that the central axes of all of said drive transmitting pins lie in a common plane formed by the abutting faces of said superposed central portions and extend through the common middle axis of said drive transmitting members, the said link being adapted to control said members.

FRITZ BRIESE.